United States Patent [19]

Troy et al.

[11] Patent Number: 4,475,102

[45] Date of Patent: Oct. 2, 1984

[54] BIRD DISPERSAL APPARATUS

[75] Inventors: David P. Troy; Raymond Franks, both of Coventry, England

[73] Assignee: Coventry City Council, Coventry, England

[21] Appl. No.: 264,398

[22] Filed: May 18, 1981

[30] Foreign Application Priority Data

Apr. 26, 1980 [GB] United Kingdom ............... 8013868
Apr. 24, 1981 [EP] European Pat. Off. ....... 81-301813.2
Apr. 24, 1981 [GB] United Kingdom ............... 8112788

[51] Int. Cl.³ ............................................. F23H 5/26
[52] U.S. Cl. .................................. 340/385; 116/17 A; 340/386; 340/573; 340/692
[58] Field of Search ............................ 116/22 A, 23; 119/77 AR; 340/386, 385, 384 R, 672, 573

[56] References Cited

U.S. PATENT DOCUMENTS

| | | | |
|---|---|---|---|
| 2,920,600 | 1/1960 | Hori et al. | 116/23 |
| 2,941,197 | 6/1960 | Marotta | 116/22 A |
| 3,412,394 | 11/1968 | Lewis et al. | 340/386 |
| 3,897,195 | 7/1975 | Finch | 116/22 A |

Primary Examiner—Glen R. Swann, III
Attorney, Agent, or Firm—Watson, Cole, Grindle & Watson

[57] ABSTRACT

An apparatus primarily for bird dispersal purposes at an airport has a remote control means provided for controlling operation of one or more sound emitting devices adapted to cause a detonation or emit a detonation-like sound at a required position or positions, e.g. in relation to an airport runway. The control is such that after a sound emission the device or each device is ready for further operation. Each device may consist of a combustion chamber having an outlet, the remote control means including a timer for initiating admission of fuel such as propane gas into the chamber for a predetermined period followed by automatic ignition of the fuel/air mixture for detonation thereof. The remote control includes provision for selective operation of the devices at different positions, e.g. adjacent a runway, and also provision for selection of devices for operation at a particular runway in use or at other required locations, i.e., where there is more than one runway or location.

5 Claims, 8 Drawing Figures

BIRD DISPERSAL APPARATUS

BACKGROUND OF THE INVENTION

Field of the invention

This invention relates primarily to bird dispersal apparatus especially for use at airports for dispersing or scaring away birds situated on or adjacent the or each runway in use or on or near other aircraft landing or take-off areas of the airport. As is well known, birds can cause considerable damage to aircraft and various procedures are in use for effecting bird dispersal at airports such as gas operated detonating guns, the playing of music such as "pop" music, or the firing of flare pistol cartridges, the latter being usually the most effective. However, such procedures entail the use of manpower specifically for the purpose and often a vehicle is necessary for their suitable operation.

SUMMARY OF THE INVENTION

The object of this invention is to provide improved bird dispersal or similar apparatus which is readily operable to suit prevailing conditions in an effective manner.

According to this invention apparatus primarily for bird dispersal purposes is characterised by remote control means for controlling operation of one or more sound emitting devices adapted to cause a detonation or emit a detonation-like sound at a required position or positions of use, the control effected being such that after said sound emission operation of the or each device it is made ready for further operation.

BRIEF DESCRIPTION OF THE DRAWINGS

In practice the arrangements and operating procedures of the apparatus are as follows, reference being had to the accompanying drawings in which.

Like parts are designated by the same or similar reference numerals whilst any FIGURES or values quoted herein are given by way of practical example only and may be varied according to requirements.

DESCRIPTION OF A PRACTICAL EMBODIMENT

Figure 1:
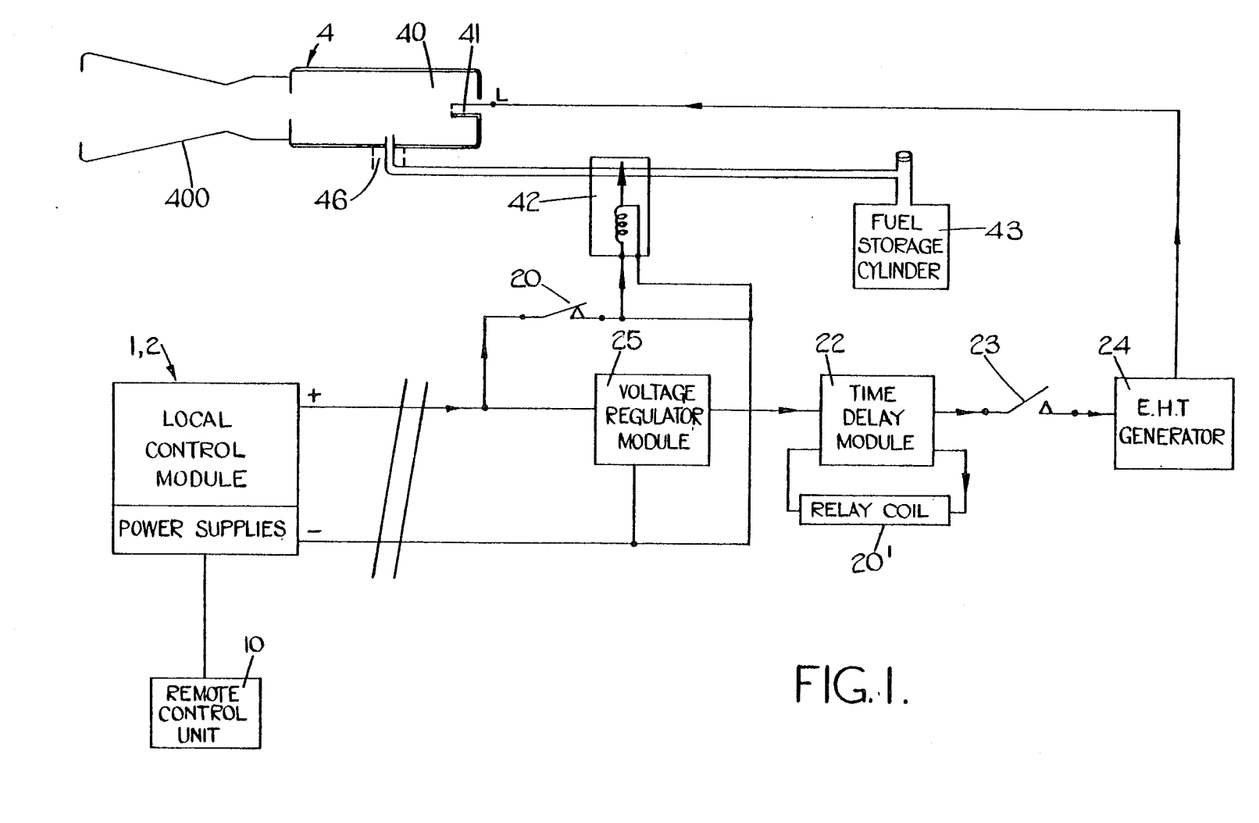
FIG. 1 is a diagrammatic layout of one arrangement of the apparatus.
Figure 2:
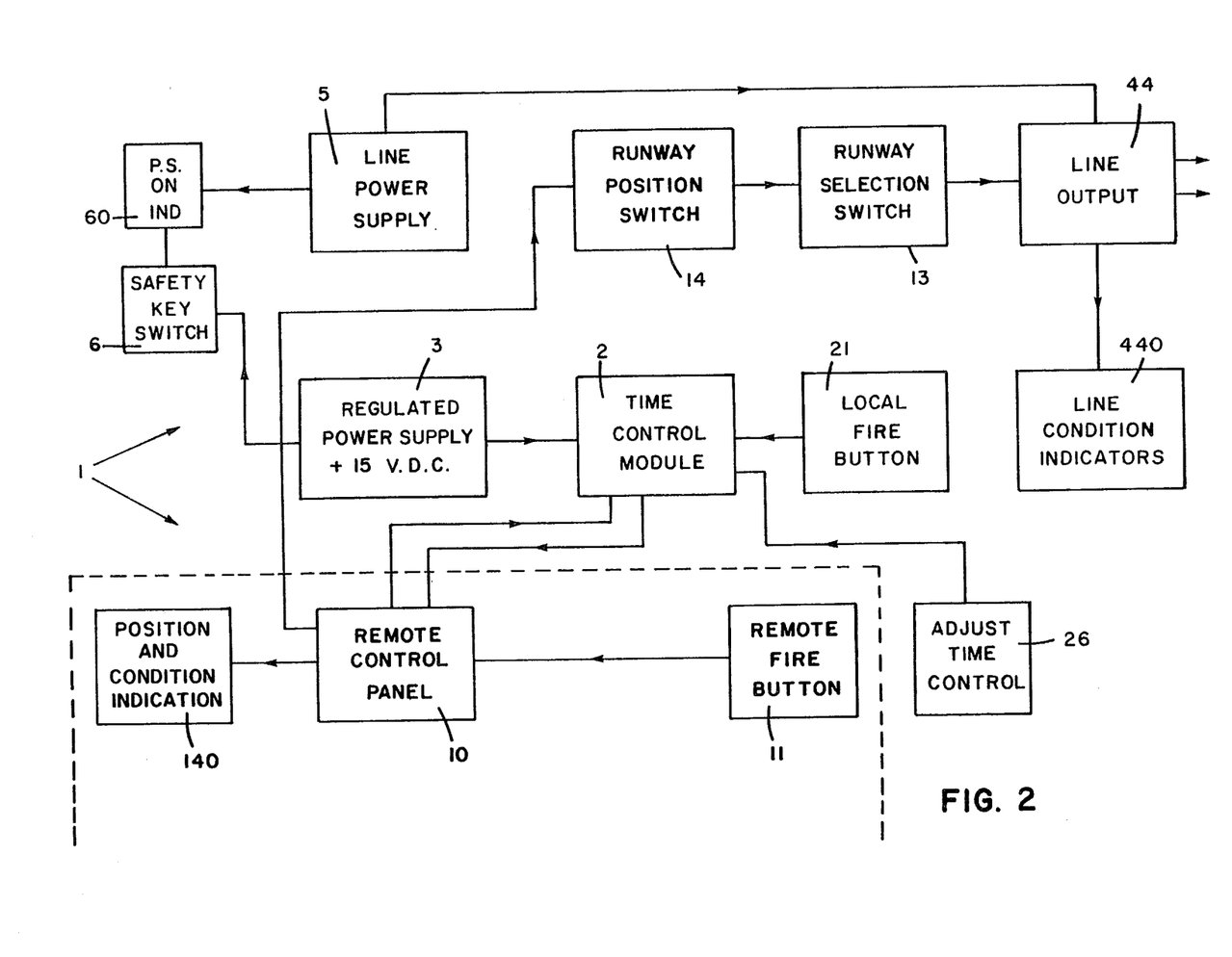
FIG. 2 is a block diagram of control and power supply means.

Referring to FIGS. 1 and 2 the apparatus comprises remote control means 1 having a control unit or panel 10 in circuit with a time control module 2 which latter may be located adjacent the remote control unit 10 or at a distance from it, e.g. in a separate equipment room. The time control module 2 controls timing, switching and indicating circuits as hereinafter referred to and is operated by a power supply 3 operating at, for example, a regulated 15 volts d.c. from a suitable electrical supply source (not shown). The control means 1 may be operated from the same source, e.g. at 50 Volts d.c.

The control means 1 is employed to operate one or more gas operated detonating devices or guns, e.g. as shown in FIG. 1 where a simple form of gas operated detonation device 4 is provided in which a combustion chamber 40 having an outlet opening or horn 400 receives a controlled quantity of combustible gas such as propane which is ignited at the required time for explosive combustion with air in the chamber 40 to provide a loud single detonation or shot of high intensity, the range of which may be of the order of 500 meters (1500 feet) with an azimuth cover of 300 meters (900 feet) at that range.

In a typical arrangement the detonation devices 4 are situated adjacent the runway or each runway of the airport, e.g. one at or near each end of the runway and one or more at intermediate positions alongside the runway and these are connected by electric cable to the control means 1 and a power supply 5, which cable is preferably buried as necessary in the ground. Referring to FIG. 2 the control means is shown including a runway selection switch 13 which is set for operation of those devices adjacent the runway in use and a runway device position switch 14 for selecting any one (or if desired more than one) detonating device 4 for operation, i.e. according to the presence or gathering of birds on or adjacent the runway in use.

Electrical power supply for the operation of the detonating devices 4 is provided at 5 and may be of the order of 6 to 100 Volts d.c. according to requirements (e.g. 50 Volts d.c.) and is shown derived from the same source as that of the regulated power supply 3 to the time control module 2, the supply to the unit 5 being effected through an isolation switch 6 and a power supply indicator 60. The switch 6 is preferably key operated for safe isolation of the detonating devices 4, e.g. when maintenance work is being carried out on them. Line output to the detonating devices 4 is indicated at 44.

On the presence or the gathering of birds being observed on or adjacent the runway in use, the runway selection switch 13 is operated if not already preselected, and in particular the runway device position switch 14 is operated for obtaining selection of the required detonation device 4 (or devices) for appropriate operation. Detonation of the selected device or devices 4 should be such as to provide a sound level of about 65 decibels under calm conditions at the flock of birds so as to have an effective scaring action yet not provide an unduly high noise level in the environment of the airport.

To obtain operation of the selected detonation device 4, the fire button 11 of the remote control unit 1 is operated and, under the control of the timing module 2, effects operation of the detonation device 4 in the following manner:

Initially a relay 20 (FIG. 1) is closed to effect operation of a solenoid operated control valve 42 which admits fuel such as propane gas from a storage container or cylinder 43 to the combustion chamber 40 of the detonation device 4 via a gas/air inlet 46. Propane gas is preferred for clean combustion and its low freezing point. Typically such admission of gas to the combustion chamber 40 may be for a period of four seconds as initially controlled by the time control module 2 after which a time delay module 22 operates the relay 20 (at 20') to close the control valve 42. At the same time as the shutting off of the gas supply, the time delay module 22 also operates a relay 23 to cause operation of a high tension generator 24 which energises an ignitor or spark plug 41 in the combustion chamber 40 for ignition of the gas/air mixture therein to effect detonation. The ignition cycle may take three seconds covering several operations or successive sparking of the ignitor 41 by the generator 24 to ensure ignition so that the total or overall time cycle between operation of the remote fire button 11 and detonation from the device 4 is seven seconds or thereabouts as determined by the timer 2. A voltage regulator 25 is shown in the line to the time delay module 22.

After a timing cycle and sequence of operation of the device 4 has been completed the apparatus is automatically ready for further operation as and when necessary.

Referring again to FIG. 2 the apparatus is shown further including a time adjustment control at 26 for the time control module 2 in order to vary the timing cycle as required and also a local fire button 21 directly connected to the time control module 2 for alternative operation of a selected detonating device 4 as and when required, e.g. during testing of the apparatus. The apparatus is also shown including line condition indicators 440 for indicating the power supply to a selected detonating device or devices 4. The remote control unit 10 also includes an indicator 140 for showing the selected device or devices 4 and their condition, i.e. whether ready for operation or in the course of operation.

Figure 3:
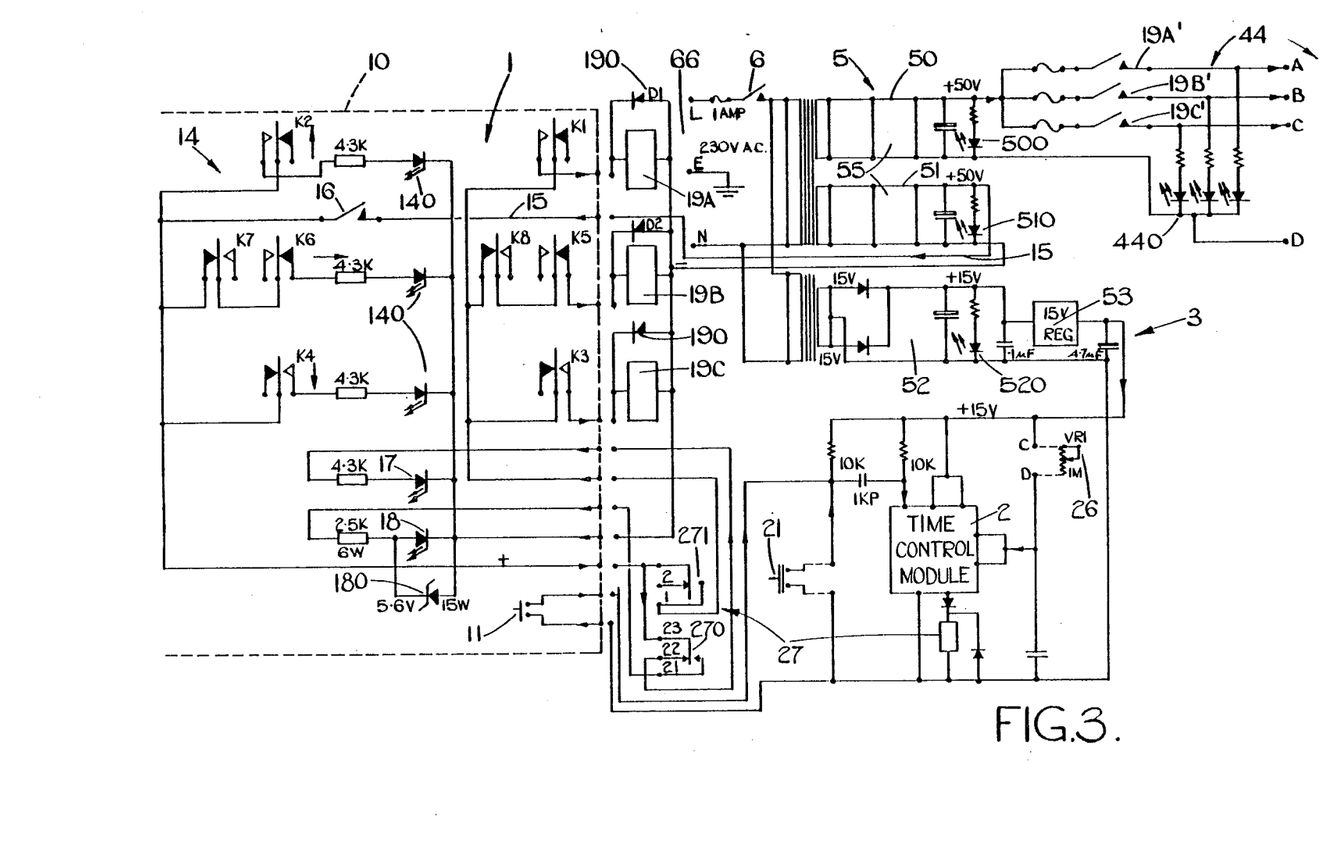
FIGS. 3 and 4 are circuit diagrams applicable to the block diagram shown in FIG. 2.
Figure 4:
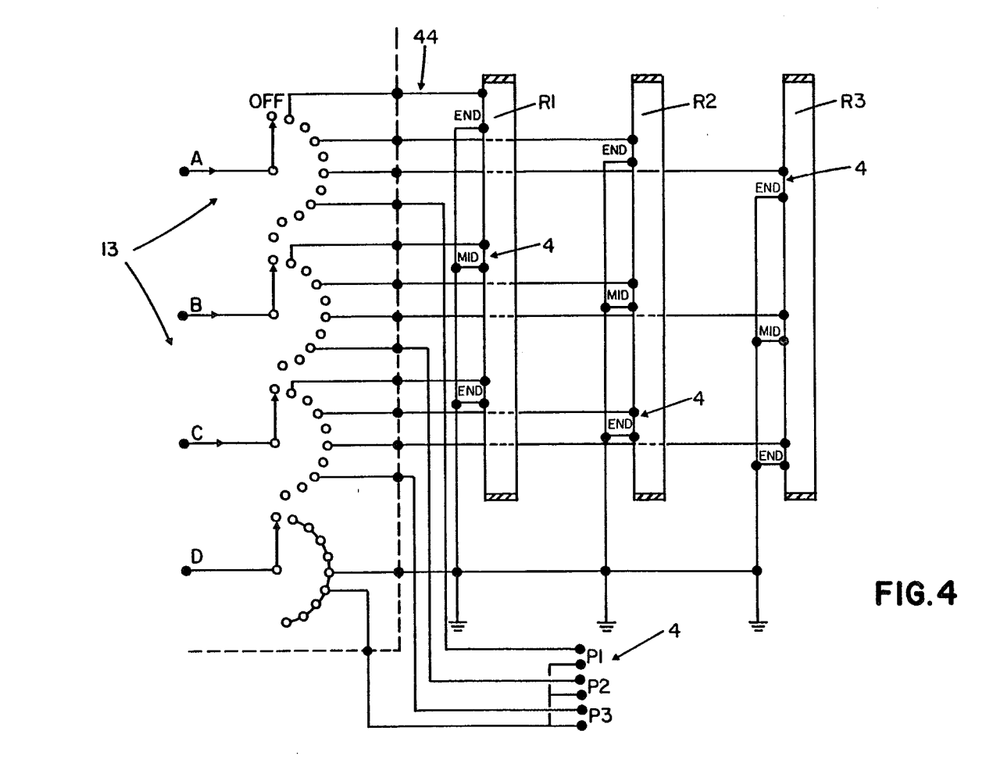

As will be appreciated the apparatus can be readily installed to suit the requirements of particular airports or similar situations and can be conveniently operated in a selective and appropriate manner as necessary, e.g. by control tower personnel during the course of aircraft landing and take-off movements. Referring to FIGS. 3 and 4 circuit diagrams are shown applicable to the block diagram of FIG. 2 and in which the same and additional reference numerals are employed.

Through an isolation switch 6 the transformer 5 is connected to an alternating current mains supply 66 and provides two output windings 50, 51 each incorporating a bridge rectifier 55 to provide a 50-Volt d.c. output, one 50 to the line output 44 and the other 51 to the remote control 1. A third output winding 52 provides a 15-Volt d.c. output at 3 to the timer 2, the voltage of this output being accurately regulated at 53 for satisfactory operation of the timer 2.

The output line 15 from the second 50-Volt winding 51 passes via an on/off switch 16 to the runway position selector switch means 14 and also via contacts 270 of a relay 27 to an indicator lamp 17, e.g. a light emitting diode (LED) which may give a green light to indicate that the apparatus is ready for use.

The runway position selector switch means 14 is shown consisting of a series of keys K1 to K8 operable together for selecting a detonating device or devices 4 at either end of a runway or at a mid-position alongside the runway and in FIG. 3 the keys K1 to K8 are shown at a mid-setting to select a mid-position detonator 4, each selection being indicated by a corresponding LED 140. In order to operate the selected mid-position detonator 4 the remote control push button switch 11 is depressed which brings into operation the timer 2 and which in turn operates the relay 27. Operation of the relay contacts 270 in this way switches off the green "ready" LED 17 and switches on a further LED at 18, e.g. flashing red to indicate that the firing cycle has commenced. In addition current is also passed via the relay contacts 271 and keys K8 and K5 to the corresponding mid-position relay 19B which is operated at 19B' to pass current from the 50-Volt transformer winding 50 to the output line B at 44. For such mid-position selection and indication keys K7, K6, K8 and K5 of the selector switch means 14 are in operation.

Where more than one runway is provided and dependent on the runway in use, the runway selector switch 13 is previously operated and as indicated in FIG. 4 consists of a ganged multi-contact switch shown in the off position but which on movement to the first contact selects runway R1 for operation of the end or mid-position detonators 4 associated therewith, i.e. from output line A, B or C (with earth return line D) as selected by the switch means 14 through relay 19A, 19B or 19C. Runway R2 or R3 can be similarly selected by the switch 13 at appropriate contacts of the latter as will be evident in FIG. 4.

Figure 5:
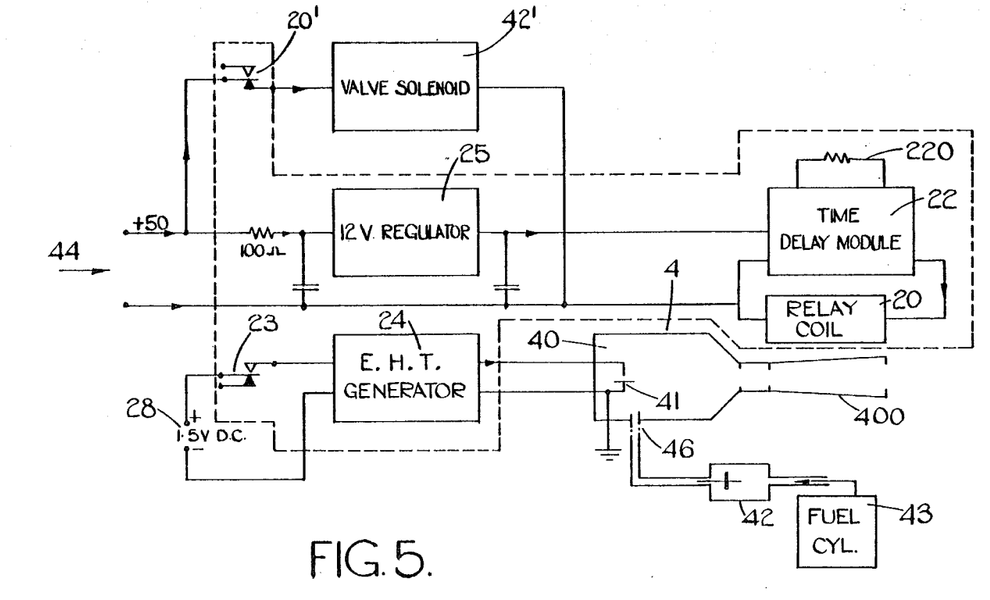
FIG. 5 is a circuit diagram applicable to the block diagram shown in FIG. 1.

The circuit associated with each detonator 4 is shown in FIG. 5 which is generally similar to that of FIG. 1, the 50-Volt supply from the selected output A, B or C of the output lines 44 passing via the closed contacts 20' of the relay 20 to the solenoid coil 42' which operates the solenoid valve 42 to admit gas into the combustion chamber 40 of the detonator 4. The input also passes via a 12-Volt regulator to a time delay module 22 providing a time delay of the order of four seconds before effecting opening of the relay 20 to cause shut-off of the valve 42 and hence the gas supply to the combustion chamber 41. At the same time the time delay module 22 also closes the relay 23 to pass current from a 1.5-Volt supply 28, (e.g. a battery) to the high tension spark generator 24 for effecting successive sparking at the contacts 41 for explosive combustion of the gas/air mixture in the combustion chamber 40 and resulting detonation. Such period of sparking, (e.g. three seconds) is terminated by the operation of the timer 2 which causes return operation of the contacts 270, 271 of the relay 27 to respectively switch off current to the flashing LED 18 and to the relays 19A, 19B, 19C and thus reset the apparatus for a further cycle of operation indicated by illumination of the green "ready" LED 17. The time delay module 22 is set by a resistor 220 which may be adjustable.

In the example shown the timer 2 thus provides overall timing of seven seconds to include a "gas-on" period of four seconds and an ignition period of three seconds. However the timing of the timer 2 can be adjusted, e.g. by the control 26.

Figure 6:
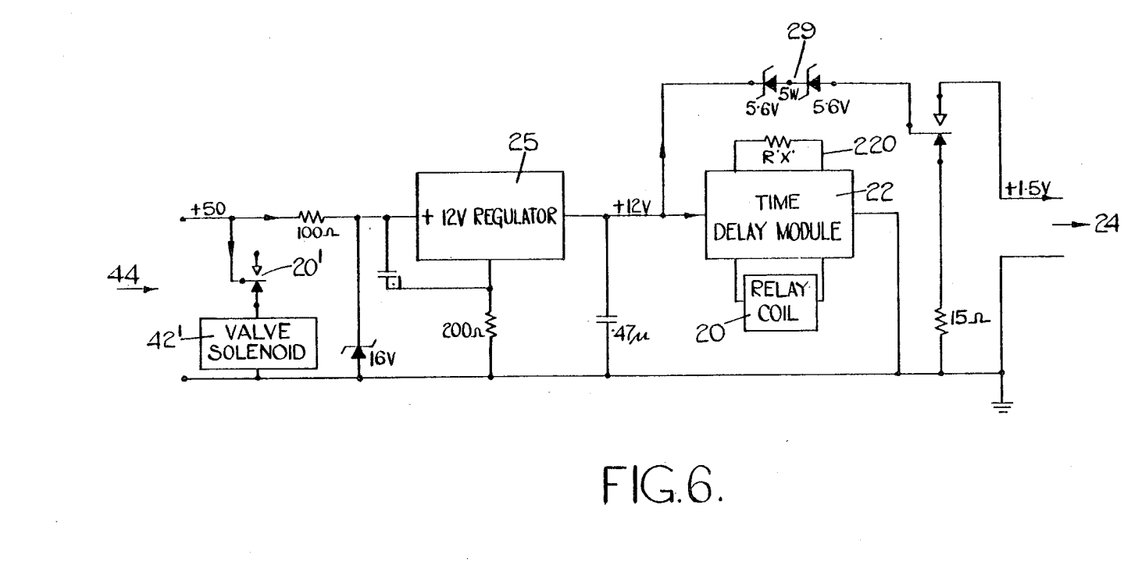
FIG. 6 is a circuit diagram relevant to FIG. 5 but showing a modification.

FIG. 6 shows a modification of the circuit diagram shown in FIG. 5 in which power supply to the spark generator 24 via the relay 23 is supplied by a pair of zener diodes 29 energised by the current input via the 12-Volt regulator 25. Reverting to FIG. 3, diodes 190 connected across the relays 19A, 19B and 19C act as suppressors to them whilst a zener diode 180 across the flashing red LED regulates its operation. The remote fire button 11 and the local button 21 are on the negative earth side of the circuit at virtually zero voltage for safe operation. LED's at 440 indicate the output line A, B or C at 44 in use and operation of the transformer windings are monitored by respective LED's 500, 510 and 520.

Referring again to FIG. 4 the selector switch means 13 is shown capable of selecting detonators at other positions P1, P2 P3, e.g. in the near vicinity of the runway or runways R1, R2 R3 where birds are likely to gather and rise as a flock into the air, such as from a pond, lake, rubbish tip or the like, so that greater scope for bird dispersal is afforded.

Figure 7:
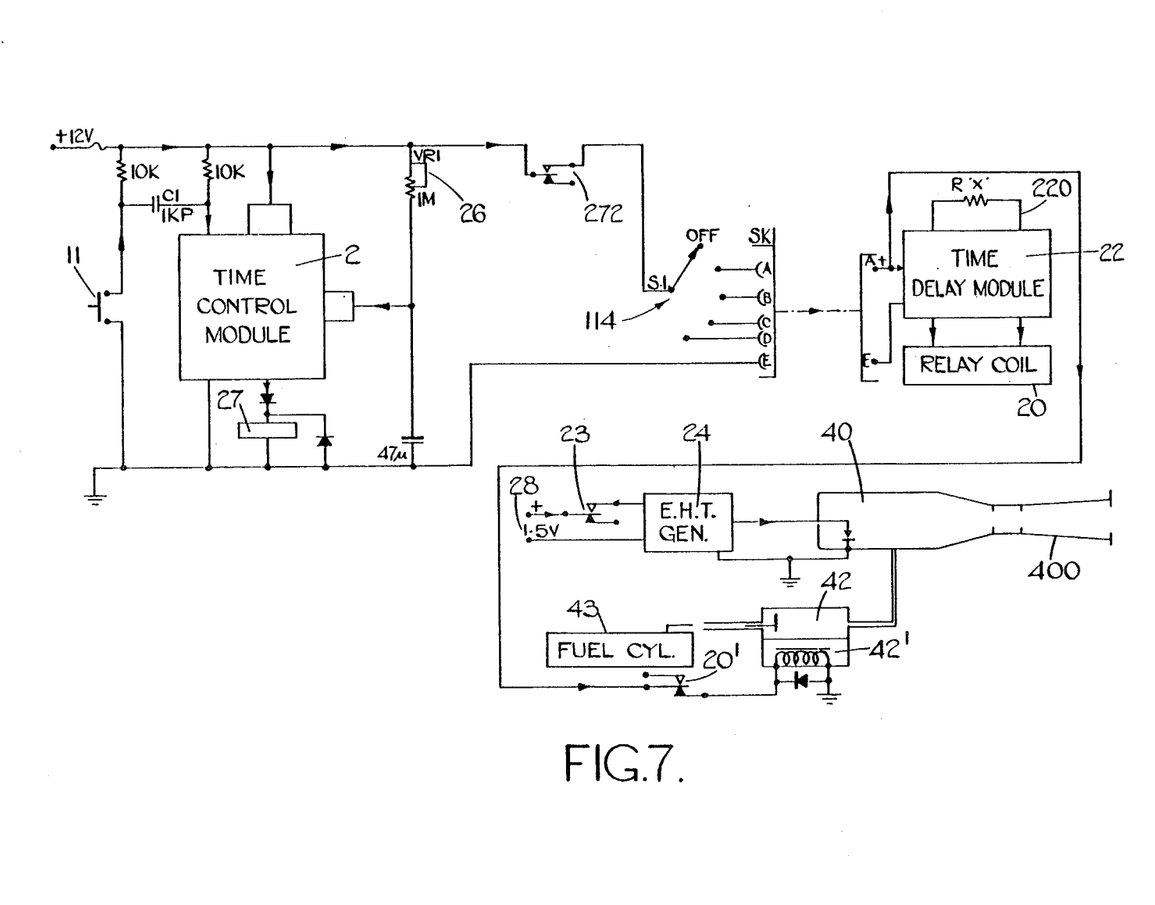
FIG. 7 is a circuit diagram of an alternative form of the apparatus suitable for portable use.

In FIG. 7 the circuit of an alternative arrangement of the apparatus is shown for portable use, e.g. on a motor vehicle and arranged to operate off the usual 12-Volt electrical supply system of the latter.

Such supply is applied to the timer 2 having provision for adjustment at 26 and is set in operation by the fire button 11 which is situated for convenient operation in the vehicle, e.g. at the driver's position. On operation of the timer 2 the contacts 272 of the relay 27 are closed to pass current to a selector switch 114 for selecting operation of a required detonating device 4 where more than one of the latter are carried by the vehicle such as on its roof. On appropriate selection, current is passed to the time delay module 22 of the selected detonator 4 and also to the relay 20, 20' for operation of the solenoid valve 42 in the manner already described for admitting gas into the combustion chamber 40 for a suitable period, e.g. four seconds. Subsequent operation of the time delay device 22 then opens the relay 20 at contacts 20' to cut off the gas supply and simultaneously closes the relay 23 for operation of the spark generator 24 and resulting explosive combustion of the gas/air mixture in the chamber 40. As before the ignition period (e.g. three seconds) is determined by the timer 2 which then switches off and so resets the apparatus for further operation.

Where the vehicle only carries a single detonating device the selector switch 114 is omitted and direct connection of the relay contacts 272 is effected to the time delay module 22 and relay 20,20'. The detonating device or devices 4 carried by the vehicle may thus be quickly taken to any required locality on or adjacent an airfield for effecting bird dispersal.

Various sections of the circuits especially that associated with each detonator 4 may be protectively encapsulated in a compact manner.

Whereas suitably buried land line connection is shown from the selector switch means 13 of FIG. 4 to each runway detonator position, other suitable signalling or communications link may be employed such as radio transmission from the control means 1 to a selected detonator or detonators 4. In addition to its primary purpose of providing effective bird dispersal apparatus capable of convenient and inexpensive operation, the apparatus also has other uses such as in the remote and usually selective operation of detonators used for railway fog signalling or similarly for marine hazard warning. A further practical appication is for effecting gun simulation during military manoeuvres.

Figure 8:
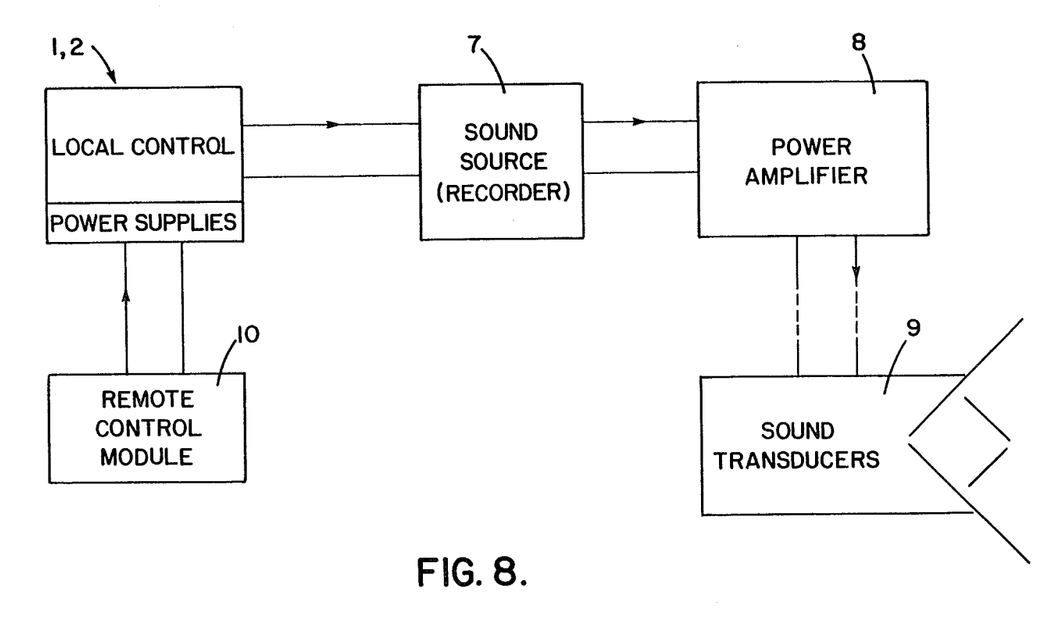
FIG. 8 is a block diagram of an alternative arrangement.

In an alternative or additional arrangement indicated in FIG. 8 a sound reinforcement system is employed controlled and operated in the manner already described, however line power supply from the time control module 2 (or direct from the fire button 11) operates a sound source, e.g. a tape recorder 7, the play back output of which is amplified by a suitable amplifier 8, e.g. capable of producing 140 watts, which in turn is arranged to drive a pair of transducers 9, (e.g. each of 40 watts) suitably arranged to produce high intensity sound at a range of 650 meters (2000 feet) or thereabouts with an azimuth cover of the order of 330 meters (980 feet) at that range. The original sound provided by the sound source or tape recorder 7 may be in the nature of a shot or detonation or several thereof, e.g. recorded from a detonation device or gun.

We claim:

1. Apparatus primarily for bird dispersal purposes comprising at least one sound emitting device comprising a combustion chamber having an outlet opening thereto; remote control switch means; electrically operated valve means arranged to be brought into operation by the remote control switch means for admission of fuel into the combustion chamber for a pre-determined period, and electrically operated ignition means automatically operable for subsequent ignition of a mixture of the admitted fuel and air in the combustion chamber in obtaining explosive combustion of said mixture to effect detonation, the electrically operated valve means and the electrically operated ignition means being thereafter ready for further operation by the remote control switch means for obtaining further explosive detonation in the combustion chamber.

2. Apparatus according to claim 1 wherein time delay means is provided for determining the period of the admission of fuel into the combustion chamber by the electrically operated valve means and thereafter causing automatic operation of the ignition means for said subsequent combustion of the fuel/air mixture in the combustion chamber.

3. Apparatus according to claim 2 wherein the time delay means causes the ignition means to operate several times over a predetermined period for a pre-determined period covering several sparking operations of the ignition means to ensure ignition of a mixture of the admitted fuel and air in the combustion chamber of the sound emitting device.

4. Apparatus according to claim 1 wherein a plurality of sound emitting devices are provided at required positions of use in relation to a locality such as an airport runway, the sound emitting devices being selectively brought into operation by the remote control switch means via selector switch means.

5. Apparatus according to claim 4 wherein the plurality of sound emitting devices are provided at required positions of use in relation to each of more than one locality such as more than one airport runway, further selector switch means being provided for selection of those sound emitting devices associated with a particular locality such as a runway in use for selective operation thereat by the remote control switch means via said first mentioned selector switch means.

* * * * *